United States Patent [19]

Sedlak, deceased et al.

[11] 3,986,988

[45] Oct. 19, 1976

[54] PROCESS FOR MAKING INSULATING MATERIALS OF LOW COMBUSTIBILITY ON THE BASIS OF THE FOAM-LIKE UREA FORMALDEHYDE RESINS

[75] Inventors: Ladislav Sedlak, deceased, late of Batizovca, Czechoslovakia; by Dagmar Sedlakova, heir; by Hvezdoslava Hrdlickova, heir, both of Brno, Czechoslovakia; Jozef Zapletal, Tatranska Strba, Czechoslovakia

[73] Assignee: Okresny stavebno-montazny podnki, Poprad, Czechoslovakia

[22] Filed: Apr. 29, 1974

[21] Appl. No.: 465,307

[52] U.S. Cl. .............................. 260/2.5 F; 264/41; 264/42
[51] Int. Cl.² .......................................... C08J 9/00
[58] Field of Search ................................ 260/2.5 F

[56] References Cited
UNITED STATES PATENTS

| | | | |
|---|---|---|---|
| 2,521,582 | 9/1950 | Keil | 195/29 |
| 3,417,037 | 12/1968 | Eastes | 260/2.5 F |
| 3,457,199 | 7/1969 | Wells | 260/2.5 F |
| 3,470,115 | 9/1969 | Moore | 260/2.5 F |
| 3,554,936 | 1/1971 | Braude | 260/2.5 F |
| 3,740,355 | 6/1973 | Klug | 260/2.5 F |

FOREIGN PATENTS OR APPLICATIONS 713,705   11/1941   Germany

OTHER PUBLICATIONS

Edwin Theis, Chemical Abstracts, vol. 38, 4968$^8$, (1944).
J. L. Stoves, Chemical Abstracts, vol. 38, 6307$^5$ (1944).
M. Blackman, Chemical Abstracts, vol. 43, 6$d$ (1949).
S. Riondet, Chemical Abstracts, vol. 45, 1354$b$ (1951).

*Primary Examiner*—Paul Lieberman
*Attorney, Agent, or Firm*—Burgess Ryan and Wayne

[57] ABSTRACT

There is provided a process for preparing insulating materials by first forming a foam product involving beating a mixture containing 5 to 15 parts by volume of water and 1 part by volume, of a keratin hydrolysate. To the foam thus prepared is added 1 to 80 parts by volume of a urea formaldehyde resin in a resol state and a setting agent. The mixture is then blended followed by the addition thereto of an inorganic and/or organic filler until the mixture assumes the consistency of a plastic mass. The plastic mass is then kneaded, poured into a mold, and then allowed to set and ripen.

5 Claims, No Drawings

PROCESS FOR MAKING INSULATING MATERIALS OF LOW COMBUSTIBILITY ON THE BASIS OF THE FOAM-LIKE UREA FORMALDEHYDE RESINS

The invention is concerned with a process for making heat and noise absorbing insulating materials of low combustibility with resistance to the effect of alkaline materials and organic solvents, increased resistance to the effect of acids coupled with a low water absorbing capacity on the basis of the foam-like urea formaldehyde resins.

The insulating materials that have been used to date in the construction industry do not entirely satisfy the needed requirements. The foam silicates have a great volume but are not resistant to acids and additionally are characterized by a poor heat and noise absorbing action. Finished parts of wood cement have a great water absorbing capacity.

The finished parts purely of synthetic foam resins such as phenol, urea formaldehyde, polyurethane, polystyrene and similar resins have only a relatively narrow field of use from the point of view of temperature. The foam-like polystyrene is combustible, with little or no resistance to organic solvents and does not tolerate high temperatures. In view of their almost perfect open structure, the foam materials cited cannot be used at temperatures below 0° C. Further, because of their basic structure, the foam materials are also characterized by a high water absorption. At temperatures above 80° C, the aforesaid foam materials deteriorate. Another disadvantage of these materials is that they are characterized by a substantial contraction in volume, in particular during the setting process, and the resulting cracks detract from the compactness of the product and thus, also, from the strength thereof.

The disadvantages mentioned have been to a great extent overcome by the insulating materials produced according to the invention involving the use of foam-like urea formaldehyde resins.

The essence of the invention consists in preparing an insulating material of low combustibility in the form of a foam by mixing from 5 to 15 parts by volume water and 1 part by volume of a foam-forming keratin hydrolysate, to which is added 1 to 80 parts by volume urea formaldehyde resin in the resol state and a setting agent, preferably citric acid, blending the mixture and then adding inorganic and/or organic fillers until the consistency of a plastic mass is obtained and after thoroughly kneading, pouring the mass in a mold and allowing it to set and ripen. In the process, the excess formaldehyde separates from the insulating material.

In the process for making insulating materials according to the invention, it is advantageous to add the setting agent already to the starting materials in the preparation of the foam, especially to the water.

An inorganic fillers there have been used, according to the invention, fibrous silicates such as fibrous asbestos and basalt padding and expanded perlite and pumice in the form of particles having a powder size not in excess of 3 mm.

As organic fillers there have been used, according to the invention, celluloses such as comminuted pumices, flax flakes and wood sawdust and waste resulting from the preparation of plastic compositions such as polyamide, foam-like polystyrene, among others.

Insulating materials produced according to the invention and filled with the aforesaid fillers possess an almost close heterogeneous structure and are partly elastic and rigid whereby their suction capacity and change of properties at temperatures of −4° C to +110° C are also substantially limited. Because of the adequate fillers, the contraction of the insulating material also diminishes substantially during the setting and in no case will it be such as to detract from the compactness of the material inasmuch as the filler compensates for the internal tension. Insulating materials can be mechanically processed, for instance, cut only after ripening when they will no longer change their shape. The ripening process at normal temperature lasts at most 10 days. The resistance to parasites and microorganisms is due to the fact that even after ripening the resin contains a certain amount of the formaldehyde. Since the filler particles are wrapped with resin, the suction capacity of the insulating material consequently decreases. After an 8-hour action of 20% sodium lye and organic solvents such as benzene, acetone and benzene, the insulating material shows no substantial changes. The insulating material is heat resistant even at 110° C. The insulating material produced according to the invention possesses, in comparison to other plastic compositions, an extraordinary heat resistance. It does not melt even at temperatures of up to 1500° C. It does not inflame, it only deteriorates whereby it forms no gases damaging to health.

The process according to the invention for producing insulating materials is explained in detail in the examples that follow.

EXAMPLE 1

From 80 l water and 8 l foam-forming keratin hydrolysate there was made, by beating, 700 l of a thick foam to which were added, while uninterruptedly stirring, 120 l urea formaldehyde resin in a resol state and 15 l concentrated citric acid solution. To the foam prepared in this manner there was added 250 l expanded perlite in powder form with a volume of 140 kg/m$^3$ and 12 kg waste of foam polystyrene having a volume of 18 kg/m$^3$. After intensive thorough kneading, the mass was poured into a mold. The preparation of the mixture developed at a temperature of 20° C and the setting at the temperature of 130° C for 48 hours under atmospheric pressure.

The product obtained had the following physico-mechanical properties:

Volume mass—200 kg/m$^3$
Resistance to pressure—2 kg/m$^2$
Resistance to alkalis
  under the action of a 20% NaOH solution for 48 hours and the temperature of 20° C, no measurable changes appeared.
Resistance to acids
  under the action of 20% acetic acid and the above mentioned conditions there were no measurable changes;
  under the action of 5% muriatic acid and the above mentioned conditions, there were no measurable changes.
The combustibility according to CS Standard No. 730853 was in group B.

EXAMPLE 2

From 60 l water, 10 l foam-forming keratin hydrolysate and 0.4 concentrated citric acid solution as setting agent there was prepared by beating, 500 l thick foam to which was added 4 l urea formaldehyde resin in a resol state and 20 l expanded perlite having a volume of 140 kg/m³ in the form of granules having a core size of 3 mm and also 70 kg flaxen flakes. The mixture was intensively thoroughly kneaded and the mass poured into a mold. The preparation of the mixture developed at a temperature of 20° C and the setting at the temperature of 100° C during 48 hours.

The product obtained had the following physico-mechanical properties:

Volume — 100 kg/m³

Resistance to pressure — 0.5 kg/m²

Resistance to alkalis:

determined according to Example 1 with no changes being observed.

Resistance to acids:

determined according to Example 1 with no changes being observed.

Resistance to solvents:

The following solvents were tested: benzene, benzene and acetone at a temperature of 20° C. Duration of the action, 20 hours. With none of the solvents was it possible to observe any measurable changes.

EXAMPLE 3

From 13 l water and 10 l keratin hydrolysate there was formed by beating 120 l foam to which was added, while uninterruptedly stirring, 70 l of urea formaldehyde resin and 20 l concentrated citric acid solution. The mixture was blended and thereto was added 50 l expanded perlite having a core size of 1 mm and a volume of 150 kg/m³ and short basalt fibers. After intensive thorough kneading, the mass obtained was poured into a mold. The preparation of the molding batch developed at 15° C and the setting was carried out for 24 hours at a temperature of 110° C.

The material obtained had the following physico-mechanical properties:

Volume — 400 kg/m³

Resistance to pressure — 5 kg/m²

The resistance to alkalis, acids and organic solvents is the same as in Example 2; no changes could be observed. The combustibility according to the CS Standard No. 730853 is in group B.

We claim:

1. A process for producing insulating materials of low combustibility which comprises forming a foam product from 5 to 15 parts by volume water and 1 part by volume of a foam-forming keratin hydrolysate, adding to said foam 1 to 80 parts by volume urea formaldehyde resin in a resol state and a setting agent, blending the mixture, adding inorganic and/or organic fillers until the consistency of a plastic mass is obtained, and after thoroughly kneading the mass, pouring it into a mold and allowing it to set and ripen.

2. A process according to claim 1 wherein the setting agent is citric acid.

3. A process according to claim 1 wherein the setting agent is added to the starting materials during the preparation of the foam.

4. A process according to claim 1 wherein the inorganic fillers are selected from the group consisting of fibrous silicates, expanded perlite and pumice stone.

5. A process according to claim 1 wherein the organic fillers are celluloses or wastes resulting from the production of plastic masses.

* * * * *